United States Patent
Iriyama et al.

(10) Patent No.: US 7,347,805 B2
(45) Date of Patent: Mar. 25, 2008

(54) ENGINE TORQUE CONTROL DEVICE

(75) Inventors: Masahiro Iriyama, Yokohama (JP); Takuya Maekawa, Zama (JP); Kenichiro Murakami, Atsugi (JP); Yuzuru Tohta, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 307 days.

(21) Appl. No.: 11/245,432

(22) Filed: Oct. 7, 2005

(65) Prior Publication Data

US 2006/0079374 A1    Apr. 13, 2006

(30) Foreign Application Priority Data

Oct. 12, 2004   (JP)   .............................. 2004-298137

(51) Int. Cl.
    *F16H 59/74*   (2006.01)
(52) U.S. Cl. ...................................... 477/102; 477/107
(58) Field of Classification Search ................ 477/101, 477/102, 107
    See application file for complete search history.

(56) References Cited

U.S. PATENT DOCUMENTS

| | | |
|---|---|---|
| 5,921,886 A | 7/1999 | Takada et al. |
| 6,597,978 B1 | 7/2003 | Dreibholz et al. |
| 7,131,933 B2 * | 11/2006 | Tabata ........................ 477/181 |
| 7,252,619 B2 * | 8/2007 | Tabata et al. ................... 477/3 |

FOREIGN PATENT DOCUMENTS

| | | | |
|---|---|---|---|
| EP | 0834681 A2 | | 4/1998 |
| JP | 03117763 A | * | 5/1991 |
| JP | H05-164225 | | 6/1993 |
| JP | 05302662 A | * | 11/1993 |
| JP | 10-89114 A | | 4/1998 |
| KR | 1991-0009489 | | 8/1992 |

* cited by examiner

*Primary Examiner*—Ha D. Ho
(74) *Attorney, Agent, or Firm*—Global IP Counselors, LLP

(57) ABSTRACT

An engine torque control device is configured to reduce shift shock during a downshift with an automatic transmission. During a downshift with an automatic transmission having a stepped shift mechanism, when the engine output (torque) is increased so as to bring it closer to being synchronized to the post-downshift engine speed, and then the torque is reduced sharply enough to maintain the synchronizing speed, and when synchronizing control is concluded so that the torque is sharply reduced to the driver's required torque in a state in which the accelerator is released, the throttle opening is reduced while any extra torque resulting from a reduction lag in the intake air quantity is cancelled out by retarding the ignition timing, thereby sufficiently lessening shift shock.

12 Claims, 5 Drawing Sheets

(A) SYNCHRONIZING REQUIREMENT FLAG (B) ENGINE TORQUE (C) IGNITION TIMING RETARDATION AMOUNT

ENGINE TORQUE CONTROL DEVICE

CROSS-REFERENCE TO RELATED APPLICATIONS

This application claims priority under 35 U.S.C. § 119 to Japanese Patent Application No. 2004-298137. The entire disclosure of Japanese Patent Application No. 2004-298137 is hereby incorporated herein by reference.

BACKGROUND OF THE INVENTION

1. Field of the Invention

The present invention relates to an engine torque control device that reduces shift shock while shortening the shift time by controlling engine output during the shifting of an automatic transmission.

2. Background Information

There is a known technique whereby shift shock is reduced by performing a shift only after engine output (torque) has been increased and brought closer to the post-downshift engine speed during a downshift with an automatic transmission having a stepped shifting mechanism. With the technique disclosed in Japanese Laid-Open Patent Publication No. 10-89114, ignition timing retardation control (torque-down control) is used along with torque-up control such as increasing the throttle opening during the downshift, which helps prevent the torque from rising too high prior to the actual shift operation.

In view of the above, it will be apparent to those skilled in the art from this disclosure that there exists a need for an improved engine torque control device. This invention addresses this need in the art as well as other needs, which will become apparent to those skilled in the art from this disclosure.

SUMMARY OF THE INVENTION

It has been discovered that with the above-mentioned torque-up control during a downshift, shift shock is lessened while a shorter shift time is achieved by, for example, initially increasing the torque by a large amount and quickly raising the engine speed to the synchronizing speed so as to synchronize to the post-shift speed, and then reducing the torque to a level that allows the synchronizing speed to be maintained, engaging the clutch of the next gear, and upon completion of this engagement, reducing the torque to the driver's required torque (negative torque when the accelerator is released).

However, even if control is performed during or upon completion of the above-mentioned torque-up control so that the throttle valve is quickly shut and the torque sharply reduced, in actual practice there is a lag in the reduction of intake air quantity due to the manifold volume, so torque cannot be sufficiently reduced, and the extra torque often resulted in jerkiness or other such sensations of unstable deceleration.

The present invention was conceived in light of these problems encountered in the past. One object of the present invention is to lessen shift shock in a short time during a downshift, while suppressing the occurrence of jerkiness, and thereby ensuring a better shift feel.

Accordingly to the present invention, engine output increasing control is performed to increase engine output torque so that engine speed approaches the post-shift engine speed during a downshift operation of an automatic transmission linked to an engine output shaft. When the engine output torque that has been increased by this engine output increasing control is to be reduced sharply, the extra torque by which the actual torque is over the target torque is cancelled out by a torque reduction by ignition timing retardation control. In other words, in order to achieve the object, the present invention provides an engine torque control device comprising an engine output torque control section and an ignition timing control section. The engine output torque control section is configured to perform an engine output torque control of an engine output torque from an engine such that an engine output increasing control adjusts engine speed to approach a post-shift engine speed during a downshift operation of an automatic transmission linked to the engine. The ignition timing control section is configured to perform an ignition timing retardation control if an actual torque exceeds a target torque, when the engine output torque that has been increased by the engine output increasing control is to be reduced.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
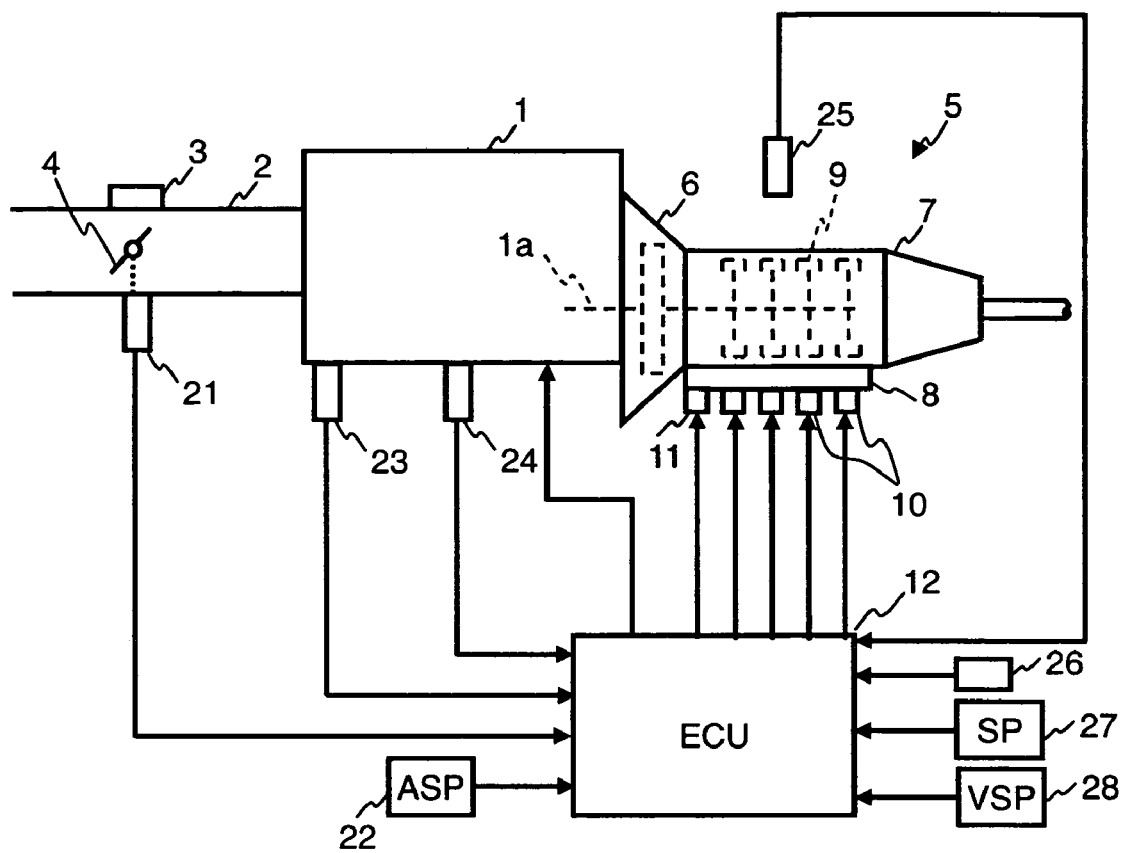
FIG. 1 is a schematic diagram of an internal combustion engine that is equipped with an engine torque control device or system in accordance with one embodiment of the present invention.

Referring initially to FIG. 1, an internal combustion engine 1 is schematically illustrated that is equipped with an engine torque control device or system in accordance with one embodiment of the present invention. In FIG. 1, the engine 1 receives intake air through an air intake passage 2 such that the intake air is supplied to each cylinder of the engine 1. The intake air passing through the air intake passage 2 to each cylinder is regulated by controlling a throttle motor 3 that operates a throttle valve 4. The operation of the throttle valve 4 by the throttle motor 3 can be accomplished in a conventional manner. Since operation of the throttle valve 4 by the throttle motor 3 can be accomplished in a conventional manner, these structures will not be discussed or illustrated in detail herein.

An automatic transmission 5 is linked to an output shaft 1a of the engine 1 in a conventional manner. This automatic transmission 5 has an automatic shift mode as well as a manual shift mode that allows the driver to shift manually. The automatic transmission 5 basically includes a torque converter 6, a shifting mechanism (gear mechanism) 7 and a hydraulic control mechanism 8. The torque converter 6 is linked to the output shaft 1a of the engine 1, with the shifting mechanism 7 being linked to the output side of this torque converter 6. The hydraulic control mechanism 8 is configured and arranged to engage and disengage various shift elements 9 (clutches, etc.) in the shifting mechanism 7.

The working hydraulic pressure of the hydraulic control mechanism 8 is controlled through various electromagnetic valves. The various electromagnetic valves are conventional components that are well known in the art. Since electromagnetic valves are well known in the art, these structures will not be discussed or illustrated in detail herein. Rather, only four shift solenoids 10 and a lock-up solenoid 11 will be depicted herein for the sake of simplicity and brevity. The shift solenoids 10 are configured and arranged to perform an automatic shifting operation. The lock-up solenoid 11 is configured and arranged to perform to lock up the torque converter 6 for transferring torque directly from the engine to the automatic transmission 5. The shift solenoids 10 and the lock-up solenoid 11 are operatively connected to an electronic control unit (ECU) 12, which selectively controls the engagement and disengagement of the shift solenoids 10 and the lock-up solenoid 11.

The electronic control unit 12 preferably includes a microcomputer with an engine control program that controls the operation of the engine 1 and an automatic shifting control program that controls the shift solenoids 10 and the lock-up solenoid 11 as well as electromagnetic valves to perform upshifting and downshifting operations. Thus, the electronic control unit 12 includes an automatic transmission control section and an engine control section with the engine control section having an engine output torque control section. As explained below, the electronic control unit 12 also includes an ignition timing control section that is configured to control the ignition timing of the engine 1. The electronic control unit 12 also preferably includes other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the electronic control unit 12 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Various signals are inputted to the electronic control unit 12 from various sensors including, but not limited to, a throttle sensor 21, an accelerator operation sensor 22, a water or coolant temperature sensor 23, an engine speed sensor 24, a gear position sensor 25, a shift mode switch 26, a shift position sensor 27, and a vehicle speed sensor 28. The throttle sensor 21 is configured and arranged to detect throttle opening amount or degree of the throttle valve 4, and output a signal indicative of the throttle opening degree of the throttle valve 4 to the electronic control unit 12. The accelerator operation sensor 22 is configured and arranged to detect the accelerator pedal depression amount APS, and output a signal indicative of the accelerator pedal depression amount APS to the electronic control unit 12. The water or coolant temperature sensor 23 is configured and arranged to detect the engine cooling water or coolant temperature Tw, and output a signal indicative of the engine coolant temperature Tw to the electronic control unit 12. The engine speed sensor 24 is configured and arranged to detect the engine speed Ne, and output a signal indicative of the engine speed Ne to the electronic control unit 12. The gear position sensor 25 is configured and arranged to detect the gear position Gp of the gear mechanism of the automatic transmission 5, and output a signal indicative of the gear position Gp to the electronic control unit 12. The shift mode switch 26 is configured and arranged to set the shift mode (automatic shift mode or manual shift mode) of the automatic transmission 5, and output a signal indicative of the current shift mode to the electronic control unit 12. The shift position sensor 27 is configured and arranged to detect the shift lever position SP, and output a signal indicative of the shift lever position SP to the electronic control unit 12. The vehicle speed sensor 28 is configured and arranged to detect the vehicle speed VSP, and output a signal indicative of the vehicle speed VSP to the electronic control unit 12.

The electronic control unit 12 basically includes an engine control unit (EGCU) 12A configured to perform engine control, and an automatic transmission control unit (ATCU) 12B configured to perform control on the automatic transmission side.

In automatic shift mode, the automatic transmission control unit 12B sets the optimal gear by referring to a preset map, etc., and controls the shift solenoids 10 so that the optimal gear is achieved, on the basis of the accelerator operation amount APS and the vehicle speed VSP. In manual shift mode, the automatic transmission control unit 12B sets the gear to one gear higher or one gear lower than the current gear, according to whether the driver has used the shift lever to make an upshift or a downshift, and controls the shift solenoids 10 so that the selected gear is achieved.

Meanwhile, the engine control unit 12A performs engine output control by performing engine control such as fuel injection control and ignition timing control on the basis of signals from the various sensors mentioned above. Also, the engine control unit 12A computes the target engine torque, and drives the throttle motor 3 to control the opening of the throttle valve 4 so that this target engine torque will be obtained. Engine output control during a downshift (synchronizing control) executed by the engine control unit 12A will now be described with reference to FIG. 2.

Figure 2:
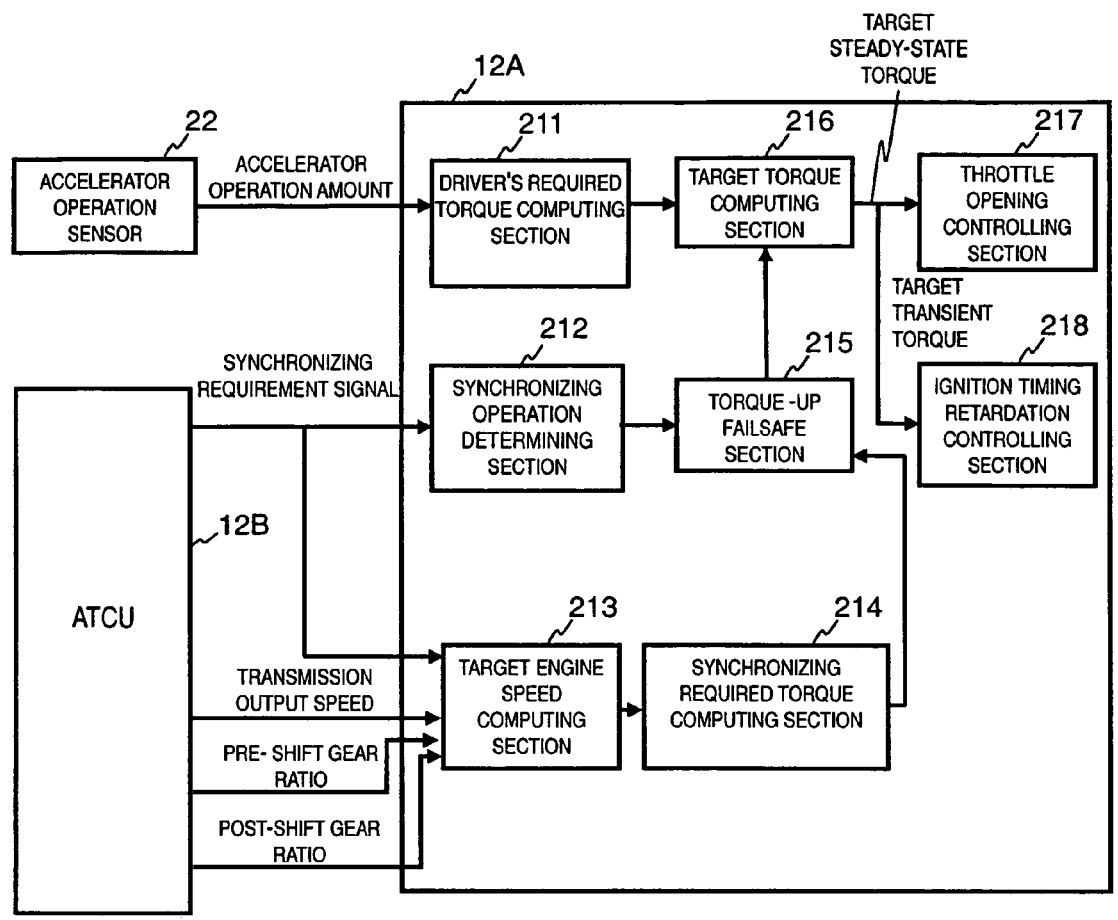
FIG. 2 is a simplified block diagram illustrating synchronizing control during a downshift operation using the engine torque control device in accordance with one embodiment of the present invention.

FIG. 2 is a simplified block diagram of the engine output control executed by the engine control unit 12A during a downshift operation. In order to carry out a downshift operation, the engine control unit 12A basically includes a driver's required torque computing section 211, a synchronizing operation determining section 212, a target engine speed computing section 213, a synchronizing required torque computing section 214, a torque-up failsafe section 215, a target torque computing section 216, a throttle opening controlling section 217, and an ignition timing retardation controlling section 218. With this construction of the engine control unit 12A of the present invention, as explained below, when increased engine torque is to be sharply reduced during engine output increasing control for lessening shift shock during a downshift, any extra amount by which the actual torque is over the target torque as a result of lag in the reduction of the amount of intake air can be cancelled out by the torque reduction produced by ignition timing retardation control, which sufficiently lessens shift shock (jerking shock).

The driver's required torque computing section 211 is configured to compute a driver's required torque TTEIF as an engine torque required by the driver on the basis of the accelerator operation amount APS from the accelerator operation sensor 22.

The synchronizing operation determining section 212 is configured to determines a state that is unsuited to performing synchronizing control, such as when ignition timing retardation control cannot be performed when there is a transient change in the synchronizing required torque (discussed below), or when there is a malfunction due to a communications error between the ATCU and the EGCU.

The automatic transmission control unit 12B is configured to output a synchromesh requirement signal (synchromesh requirement flag), a transmission output shaft speed signal (i.e., vehicle speed signal), a current pre-shift gear position signal, and a post-shift gear signal to the target engine speed computing section 213. When a downshift is made in the manual shift mode, that is, when a need for synchronizing control arises, initially the target engine speed TNe synchronized to the pre-shift gear is computed by the target engine speed computing section 213 on the basis of the pre-shift gear position signal from the automatic transmission control unit 12B. Then, after a specific amount of time has elapsed, the target engine speed vsynchronized to the post-shift gear is computed by the target engine speed computing section 213 on the basis of the post-shift gear signal from the automatic transmission control unit 12B.

The synchronizing required torque computing section 214 is configured to compute a synchronization required torque TQTMSTAC as an engine torque necessary to achieve the target engine speed TNe computed by the target engine speed computing section 213.

The torque-up failsafe section 215 is configured to allow synchronizing control to be executed only when necessary, according to whether or not there is a requirement for synchronizing control, and on the condition that synchronizing control has been prohibited by the synchronizing operation determining section 212.

The target torque computing section 216 is configured to compute (selects) a final target torque as the larger of the driver's required torque TTEIF computed by the driver's required torque computing section 211 and the synchronization required torque TQTMSTAC computed by the synchronization required torque computer 214 that has undergone failsafe processing by the torque-up failsafe component 215, according to whether or not there is a synchronizing control requirement (control command). The specific computation will be described in detail in the description of a flowchart below.

The throttle opening controlling section 217 is configured to compute the target throttle opening TVO according to a target torque selected by the target torque computing section 216, and then feedback control the throttle opening on the basis of the target throttle opening.

Meanwhile, the ignition timing retardation controlling section 218 is configured to retard the ignition timing according to a difference between the actual torque and the target transient torque. This ignition timing retardation control will also be described in detail through the flowchart below.

Figure 3:
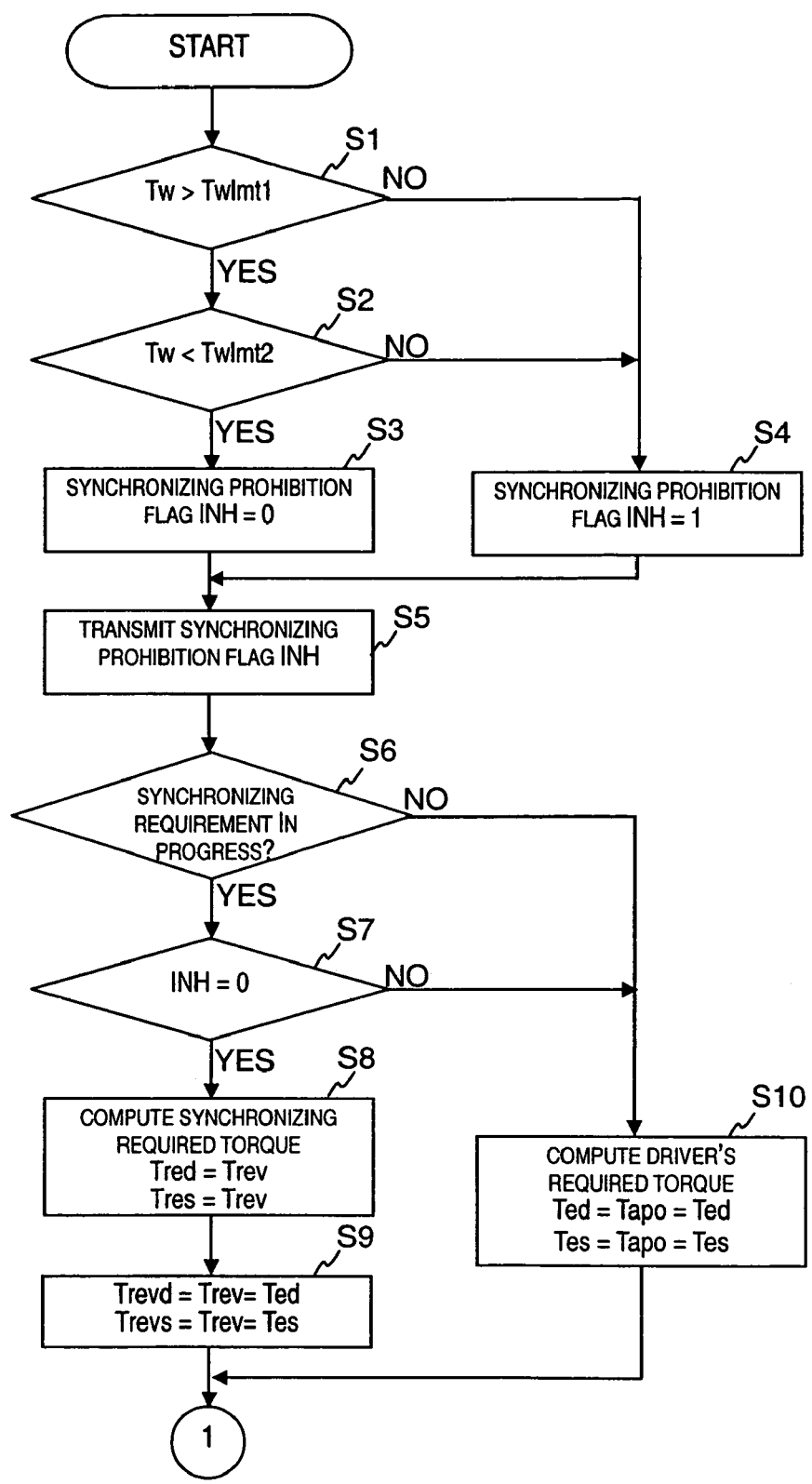
FIG. 3 is a flowchart illustrating the processing that is executed by the engine torque control device when in the gear prior to the synchronizing control in accordance with one embodiment of the present invention.

FIG. 3 is a flowchart of the computation of the target engine speed by the target engine speed computing section 213.

In step S1, the target engine speed computing section 213 determines whether the water temperature Tw detected by the water temperature sensor 23 is higher than a synchronizing control operation water temperature lower limit Twlmt1. When the water temperature is low enough to be equal to or less than the synchronizing control operation water temperature lower limit Twlmt1, there may be times when ignition timing retardation control is being performed in order to raise the exhaust gas temperature to improve warm-up. Thus, the lower limit Twlmt1 is set to a value such that ignition timing retardation control cannot be performed (little margin for retardation) when the target torque is to be sharply reduced during synchronizing control.

If the target engine speed computing section 213 determines in step S1 that the water temperature Tw is higher than the synchronizing control operation water temperature lower limit Twlmt1, then the processing proceeds to step S2.

In step S2, the target engine speed computing section 213 determines whether the water temperature Tw is lower than a synchronizing control operation water temperature upper limit Twlmt2. If ignition timing retardation control is performed at a high water temperature that is equal to or greater than the synchronizing control operation water temperature upper limit Twlmt2, there is the possibility that warm-up will be excessive and overheating will occur. Thus, the upper limit Twlmt2 is set to a value such that, again, ignition timing retardation control cannot be performed.

In step S2, if the target engine speed computing section 213 determines that the water temperature Tw is less than the upper limit Twlmt2, that is, if the water temperature Tw is within the proper range of Twlmt1<Tw<Twlmt2, then the processing proceeds to step S3. In step S3, a synchronizing prohibition flag INH is set to 0. Then the processing proceeds to step S5.

However, in steps S2 and 3, if the target engine speed computing section 213 determines that the water temperature Tw is equal to or less than the lower limit Tlwmt1, or equal to or greater than the upper limit Twlmt2, then the processing proceeds to step S4.

In step S4, the synchronizing prohibition flag INH is set to 1 so that the synchronizing control is prohibited from being executed. Then the processing proceeds to step S5.

In step S5, the signal for the synchronizing prohibition flag INH is transmitted to the automatic transmission control unit 12B.

In step S6, the target engine speed computing section 213 determines whether or not there is a synchronizing requirement exists. If the target engine speed computing section 213 determines that the synchronizing requirement exists, then the processing proceeds to step S7, where it is determined whether or not the synchronizing prohibition flag INH is at 0. If the target engine speed computing section 213 determines the synchronizing prohibition flag INH to be at 0, it is concluded that the synchronizing control can be executed, so the processing proceeds to step S8, and the synchronizing required torque Trev is calculated.

At this point, in step S8, the transient synchronizing required torque Trevd is computed separately from the steady-state synchronizing required torque Trevs in order to roughly synchronize the engine speed Ne to the post-shift speed with this synchronizing control and sharply reduce the torque enough to maintain the synchronized speed. More specifically, the transient synchronizing required torque Trevd is computed so that there will be a reduction at a specific speed (specific rate of change) versus a stepped change in the steady-state synchronizing required torque from the required torque for raising the speed to the required torque for maintaining the synchronizing speed. With the above computation, in a steady state, the transient synchronizing required torque Trevd is equal to the steady-state synchronizing required torque Trevs (i.e., Trevd=Trevs).

In step S9, the transient synchronizing required torque Trevd is set as the target transient torque Ted, and the steady-state synchronizing required torque Trevs is set as the target steady-state torque Tes (in a steady state, Ted=Tes=Trevs).

Meanwhile, when the target engine speed computing section 213 determines in steps S6 and S7 that a synchronizing requirement is not in progress, or when it is determined that the synchronizing prohibition flag INH is 1 and synchronizing is prohibited, then the processing proceeds to step S10.

In step S10, the driver's required torque Tapo is computed on the basis of the accelerator operation amount APO. In a transient state, the computed driver's required torque Tapo is set as the target transient torque Tred, and in a steady state it is set as the target steady-state torque Tes.

Then, in step S11, the target throttle opening TVO is computed through reference to a map and on the basis of the target steady-state torque Tes and the engine speed Ne, and the throttle valve opening is controlled so as to achieve the target throttle opening TVO.

In step S12, the steady-state synchronizing required torque Trevs is subjected to temporary lag processing as shown in the formula below, and the actual torque Tesf accompanying the lag in the amount of intake air in transient throttle opening control is computed.

$$Tesf = G \cdot Trevs + (1-G) \cdot Tresfz$$

Tesf: steady-state torque after temporary lag processing (=actual torque)

Tresfz: previous value of Tesf

In step S13, the difference DTes between the actual torque and the target transient torque is computed from the following formula.

$$DTes = Tesf - Ted$$

This difference DTes essentially occurs at two times. First, the difference DTes occurs when the transient synchronizing required torque Trevd is computed as the target transient torque Ted and when the torque is to be sharply reduced upon determining that the synchronization speed has been approximately reached during the above-mentioned synchronizing control. Second, the difference DTes occurs when the synchromesh requirement flag is 0, synchronizing control is concluded, and the target torque is reduced in steps from the steady-state synchronizing required torque Trevs at which the synchronizing speed is maintained to the negative driver's required torque Ted equivalent to an accelerator operation amount of 0. At these times, if the only control is to sharply reduce the throttle opening according to the sharp reduction in target torque, then the actual torque cannot be sharply reduced to the target torque because of the response lag of the intake air quantity.

In view of this, in step S14, the ignition timing retardation amount RTD corresponding to the difference DTes in torque is computed, and the ignition timing is retarded by this retardation amount RTD.

Figure 4:
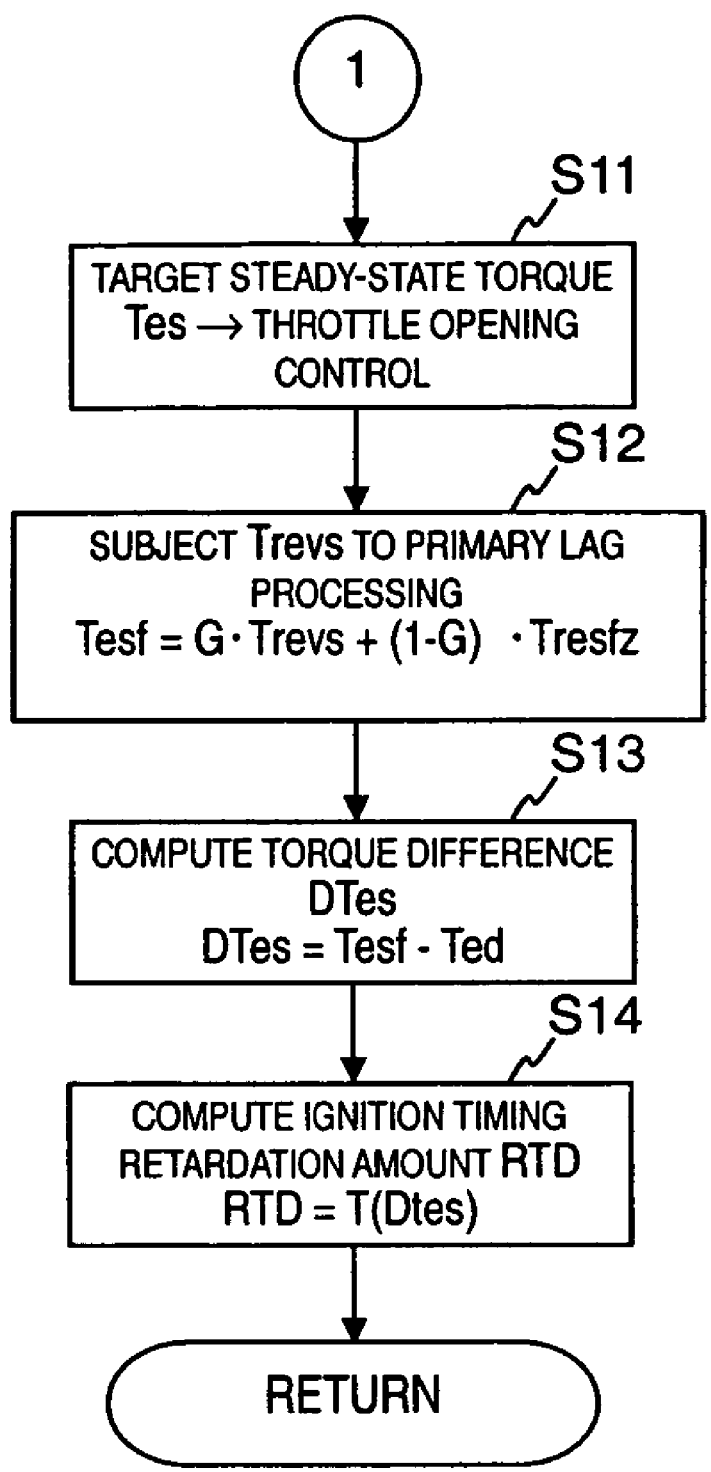
FIG. 4 is a flowchart illustrating the processing that is executed by the engine torque control device when in the gear after the synchronizing control in accordance with one embodiment of the present invention.
Figure 5:
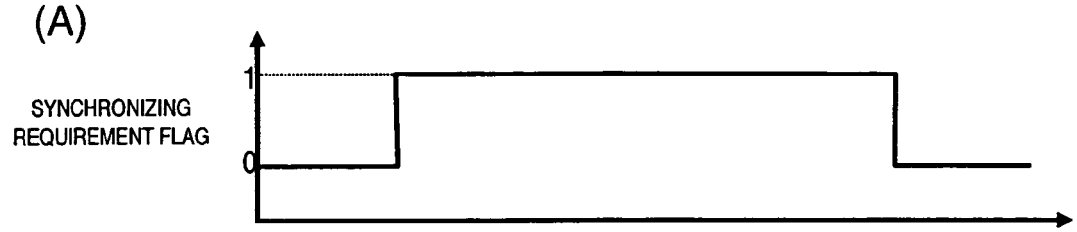
FIG. 5 is a time chart showing the changes in the various states of selected vehicle parameter occurring during in the synchronizing control executed by the engine torque control device of the present invention as seen in part (A) in comparison to the changes in the various states of selected vehicle parameter occurring during conventional control as seen in part (B).
Figure 5:
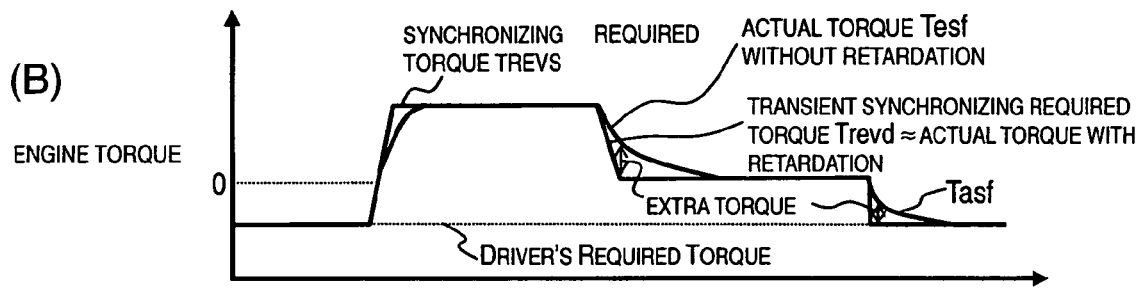
Figure 5:
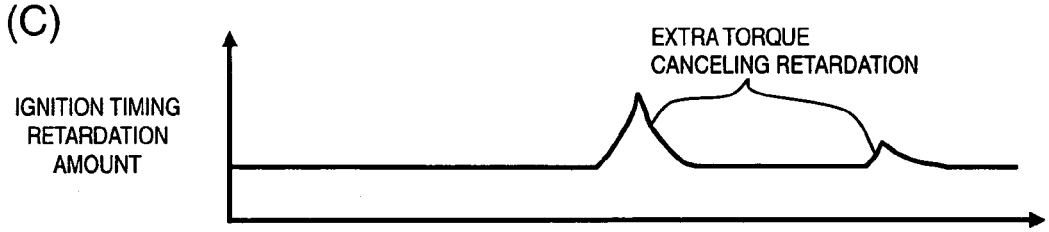

FIG. 4 shows the change in various state amounts during synchronizing control (including before and after). A series of control operations will be described through reference to FIG. 4.

At the same time that the synchromesh requirement flag becomes 1 and the pre-shift clutch disengagement is performed, the synchronizing control is commenced, the throttle opening is increased, and the engine speed Ne is raised. Here again, there is a response lag in the increase of the intake air quantity, so lag occurs in the torque increase, but if the ignition timing is retarded while the throttle opening is also controlled to be greater than that discussed in the above-mentioned Japanese Laid-Open Patent Publication No. 10-89114, then overshoot of the engine speed Ne can be minimized while being increased to the post-shift synchronizing speed in a short time.

The engagement of the clutch corresponding to the post-shift gear position is commenced at the point when the engine speed Ne has increased to approximately the post-shift synchronizing speed and the pre-shift disengagement of the clutch has concluded. At the point when this engagement begins, the steady-state synchronizing required torque Trevs is switched from the torque used for increasing up to the synchronizing speed to the torque used for maintaining the synchronizing speed. The transient synchronizing required torque Trevd is then computed as the substantial target torque (target transient torque) so that the reduction will be at a specific rate.

As discussed above, a reduction lag in the intake air quantity occurs when the throttle opening is reduced in steps according to the steady-state synchronizing required torque Trevs, which is reduced in steps, and the actual torque that is reduced at a lag is computed by subjecting the steady-state synchronizing required torque Trevs to temporary lag processing (weighted averaging).

Upon conclusion of the synchronizing control, the target torque is reduced in steps from the steady-state synchronizing required torque Trevs at which the synchronizing speed is maintained to the negative driver's required torque Tes (i.e., Tes=Ted). Again, there is a lag in the reduction of intake air quantity when the throttle opening is reduced in steps, and the actual torque that is reduced at a lag is computed by subjecting the steady-state synchronizing required torque Trevs to temporary lag processing (weighted averaging).

The difference computed as above between the actual torque and the target torque (the transient synchronizing required torque when the synchronizing control is in progress, the driver's required torque when the synchronizing control has been concluded) is cancelled out by reducing the torque by ignition timing retardation, and the torque is approximately controlled to the target torque in a transient state as well, which ensures that downshifting will take less time, suppresses the occurrence of excessive torque, and sufficiently lessens shift shock (jerking shock).

With this embodiment, shift shock was avoided by prohibiting synchronizing control (switching it to ordinary shift control) on the condition that ignition timing retardation control could not be performed because of the water temperature, etc., but another possible constitution is to reduce shift time as much as possible while lessening shift shock during clutch engagement by subjecting the shift speed (clutch engagement speed) to reduction correction (in which shifting is faster than in ordinary shift control) by retarding the hydraulic pressure increase rate.

As used herein to describe the above present invention, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An engine torque control device comprising:
    an engine output torque control section configured to perform an engine output torque control of an engine output torque from an engine such that an engine output increasing control adjusts engine speed to approach a post-shift engine speed during a downshift operation of an automatic transmission linked to the engine; and
    an ignition timing control section configured to perform an ignition timing retardation control if an actual torque exceeds a target torque, when the engine output torque that has been increased by the engine output increasing control is to be reduced.

2. The engine torque control device according to claim 1, wherein
    the ignition timing control section is further configured to continue performing the ignition timing retardation control even after conclusion of an engine output increasing control requirement, as long the actual torque exceeds the target torque.

3. The engine torque control device according to claim 1, wherein
    the engine output torque control section is further configured to prohibit the engine output increasing control when the ignition timing retardation control cannot be performed.

4. The engine torque control device according to claim 1, wherein
    the engine output torque control section is further configured to slow a shift speed during the engine output increasing control when the ignition timing retardation control cannot be performed.

5. The engine torque control device according to claim 3, wherein
    the engine output torque control section is further configured to determine that the ignition timing retardation control cannot be performed when an engine coolant temperature is at or below a specific level.

6. The engine torque control device according to claim 3, wherein
    the engine output torque control section is further configured to determine that the ignition timing retardation control cannot be performed when an engine coolant temperature is at or above a specific level.

7. The engine torque control device according to claim 2, wherein
    the engine output torque control section is further configured to prohibit the engine output increasing control when the ignition timing retardation control cannot be performed.

8. The engine torque control device according to claim 2, wherein
    the engine output torque control section is further configured to slow a shift speed during the engine output increasing control when the ignition timing retardation control cannot be performed.

9. The engine torque control device according to claim 4, wherein
    the engine output torque control section is further configured to determine that the ignition timing retardation control cannot be performed when an engine coolant temperature is at or below a specific level.

10. The engine torque control device according to claim 4, wherein
    the engine output torque control section is further configured to determine that the ignition timing retardation control cannot be performed when an engine coolant temperature is at or above a specific level.

11. An engine torque control device comprising:
    engine output torque control means for performing an engine output torque control of an engine output torque from an engine such that engine speed approach a post-shift engine speed during a downshift operation of an automatic transmission linked to the engine; and
    ignition timing control means for performing an ignition timing retardation control if an actual torque exceeds a target torque, when the engine output torque that has been increased by the engine output control means is to be reduced.

12. A method of controlling engine torque comprising:
    performing an engine output torque control of an engine output torque from an engine such that an engine output increasing control adjusts engine speed to approach a post-shift engine speed during a downshift operation of an automatic transmission linked to the engine; and
    performing an ignition timing retardation control if an actual torque exceeds a target torque, when the engine output torque that has been increased by the engine output increasing control is to be reduced.

* * * * *